US012655852B2

(12) United States Patent (10) Patent No.: US 12,655,852 B2
Botkin et al. (45) Date of Patent: Jun. 16, 2026

(54) CEILING FAN, BLADE, AND BLADE CONNECTOR

(71) Applicant: Hunter Fan Company, Memphis, TN (US)

(72) Inventors: Charles William Botkin, Cordova, TN (US); Douglas Troy Mason, Horn Lake, MS (US); Bobby Neal Norwood, Oakland, TN (US); Matthew McPherson, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 29 days.

(21) Appl. No.: 18/910,063

(22) Filed: Oct. 9, 2024

(65) Prior Publication Data

US 2025/0027508 A1 Jan. 23, 2025

Related U.S. Application Data

(63) Continuation of application No. 18/523,510, filed on Nov. 29, 2023, now Pat. No. 12,158,160, which is a (Continued)

(51) Int. Cl.
*F04D 29/34* (2006.01)
*F04D 25/08* (2006.01)
(Continued)

(52) U.S. Cl.
CPC .......... *F04D 29/34* (2013.01); *F04D 25/088* (2013.01); *H04B 1/40* (2013.01); *H04B 15/00* (2013.01);
(Continued)

(58) Field of Classification Search
CPC ......... F04D 29/34; F04D 25/088; H04B 1/40; H04B 15/00; H04L 1/0042; H04L 5/0046;
(Continued)

(56) References Cited

U.S. PATENT DOCUMENTS 777,577 A 12/1904 Wedge
5,304,037 A * 4/1994 Scofield ................... F04D 29/34
416/214 R (Continued)

FOREIGN PATENT DOCUMENTS

CN 211082380 U 7/2020
TW 443438 U 6/2001

OTHER PUBLICATIONS

Chinese Patent Office, Chinese Office Action Re: Corresponding Application No. 202310357692.4, dated Dec. 8, 2025, 10 pages.

*Primary Examiner* — Logan M Kraft
*Assistant Examiner* — John D Bailey
(74) *Attorney, Agent, or Firm* — McGarry Bair PC; Mark A. Davis

(57) ABSTRACT

A ceiling fan or similar air-moving device can include a motor for rotating one or more blades to drive a volume of air about a space. A connector can be used to connect the blade to a blade iron to mount the blade to the motor. The connector can include a set of receptacles configured to insert into openings on the blade, with the set of receptacles connected by a set of arms. A set of mount posts on the blade iron can seat within the receptacles to mount the blade to the blade iron.

22 Claims, 8 Drawing Sheets

Related U.S. Application Data continuation of application No. 18/155,234, filed on Jan. 17, 2023, now Pat. No. 11,939,989.

(60) Provisional application No. 63/328,068, filed on Apr. 6, 2022.

(51) Int. Cl.

| | | |
|---|---|---|
| *H04B 1/40* | (2015.01) | |
| *H04B 15/00* | (2006.01) | |
| *H04L 1/00* | (2006.01) | |
| *H04L 5/00* | (2006.01) | |
| *H04L 25/02* | (2006.01) | |
| *H04L 27/04* | (2006.01) | |
| *H04L 27/18* | (2006.01) | |
| *H04L 27/34* | (2006.01) | |
| *H04L 27/36* | (2006.01) | |
| *H04L 27/38* | (2006.01) | |

(52) U.S. Cl.
CPC .......... *H04L 1/0042* (2013.01); *H04L 5/0046* (2013.01); *H04L 25/0202* (2013.01); *H04L 25/0212* (2013.01); *H04L 25/0224* (2013.01); *H04L 27/04* (2013.01); *H04L 27/18* (2013.01); *H04L 27/183* (2013.01); *H04L 27/34* (2013.01); *H04L 27/36* (2013.01); *H04L 27/38* (2013.01)

(58) Field of Classification Search
CPC ............. H04L 25/0202; H04L 25/0212; H04L 25/0224; H04L 27/04; H04L 27/18; H04L 27/183; H04L 27/34; H04L 27/36; H04L 27/38
USPC ......................................................... 375/219
See application file for complete search history.

(56) References Cited

U.S. PATENT DOCUMENTS

| | | | | |
|---|---|---|---|---|
| 5,458,464 | A | 10/1995 | Lee | |
| 5,464,323 | A * | 11/1995 | Scofield | F04D 25/088 |
| | | | | 29/889 |
| 5,944,486 | A | 8/1999 | Hodgkins, Jr. | |
| 6,010,306 | A | 1/2000 | Bucher et al. | |
| 6,039,540 | A * | 3/2000 | Wu | F04D 25/088 |
| | | | | 416/207 |
| 6,241,476 | B1 | 6/2001 | Lee | |
| 6,309,183 | B1 | 10/2001 | Bucher et al. | |
| 6,508,629 | B2 | 1/2003 | Kerr, Jr. | |
| 6,585,488 | B1 | 7/2003 | Bucher | |
| 6,652,236 | B2 | 11/2003 | Hai | |
| 6,758,626 | B1 | 7/2004 | Tseng | |
| 6,821,091 | B2 | 11/2004 | Lee | |
| 6,872,053 | B2 | 3/2005 | Bucher | |
| 6,902,375 | B2 | 6/2005 | Bird et al. | |
| 6,932,576 | B2 | 8/2005 | Bird | |
| 6,935,842 | B2 | 8/2005 | Tai | |
| 7,223,078 | B1 | 5/2007 | Mares et al. | |
| 7,281,899 | B1 | 10/2007 | Bucher et al. | |
| 7,527,478 | B2 | 5/2009 | Pearce | |
| 7,762,782 | B2 | 7/2010 | Wang | |
| 7,771,172 | B2 * | 8/2010 | Wang | F04D 29/34 |
| | | | | 416/207 |
| 7,775,771 | B2 | 8/2010 | Wang | |
| 8,021,119 | B2 | 9/2011 | Wang | |
| 8,029,243 | B2 * | 10/2011 | Wang | F04D 25/088 |
| | | | | 416/220 R |
| 8,092,184 | B2 | 1/2012 | Wang | |
| 8,197,216 | B2 | 6/2012 | Wang | |
| 8,727,732 | B2 | 5/2014 | Webb et al. | |
| 8,845,293 | B1 | 9/2014 | Lowe et al. | |
| 9,279,428 | B2 | 3/2016 | Lowe et al. | |
| 9,482,242 | B1 * | 11/2016 | Mares | F04D 29/322 |
| 10,527,084 | B2 | 1/2020 | Prevost | |
| 2002/0127106 | A1 * | 9/2002 | Kerr, Jr. | F04D 29/34 |
| | | | | 416/207 |
| 2003/0228224 | A1 * | 12/2003 | Lee | F04D 25/088 |
| | | | | 416/206 |
| 2004/0009068 | A1 | 1/2004 | Pearce | |
| 2004/0208747 | A1 | 10/2004 | Pearce | |
| 2004/0219023 | A1 | 11/2004 | Bird et al. | |
| 2008/0107529 | A1 * | 5/2008 | Friedman | F04D 29/005 |
| | | | | 29/889.21 |
| 2008/0175713 | A1 | 7/2008 | Pearce | |
| 2009/0035140 | A1 * | 2/2009 | Wang | F04D 25/088 |
| | | | | 416/210 R |
| 2009/0035143 | A1 * | 2/2009 | Wang | F04D 29/34 |
| | | | | 416/220 R |
| 2010/0124504 | A1 * | 5/2010 | Yao | F04D 25/088 |
| | | | | 416/214 R |
| 2017/0175773 | A1 * | 6/2017 | Mckee | F04D 29/34 |
| 2019/0113041 | A1 | 4/2019 | Walker, Jr. et al. | |
| 2019/0360497 | A1 | 11/2019 | Guo et al. | |
| 2020/0063746 | A1 | 2/2020 | Botkin et al. | |
| 2023/0111026 | A1 * | 4/2023 | Wang | F04D 29/34 |
| | | | | 416/210 R |

* cited by examiner

CEILING FAN, BLADE, AND BLADE CONNECTOR

CROSS-REFERENCE TO RELATED APPLICATION

This application is a continuation of U.S. Pat. No. 18,523,510, filed Nov. 29, 2023, now allowed, which is a continuation of U.S. patent application Ser. No. 18/155,234, filed Jan. 17, 2023, now U.S. Pat. No. 11,939,989, which claims priority to U.S. Provisional Patent Application No. 63/328,068, filed Apr. 6, 2022, of which is hereby incorporated herein by reference in its entirety.

FIELD OF INVENTION

This application is directed to a ceiling fan for moving a volume of air about a space, and more specifically, to a blade for a ceiling fan and a blade connector for connecting the blade to the ceiling fan.

BACKGROUND

Ceiling fans are machines traditionally suspended from a structure for moving a volume of air about an area. The ceiling fan includes a motor, with a rotor and stator, suspended from and electrically coupled to the structure. A set of blades mount to the rotor such that the blades are rotatably driven by the rotor, and can be provided at an angled orientation to move volume of air about the area

BRIEF DESCRIPTION

In one aspect, the disclosure relates to a ceiling fan comprising a motor; a blade having an upper surface and an opposing lower surface, with a set of openings passing through at least one of the upper surface or lower surface, and the blade extending between a root and a tip; a blade iron including a set of mount posts arranged complementary to the set of openings and a first mount post from the set of mount posts terminates, within a corresponding opening, between the upper surface and lower surface; a connector comprising: a set of receptacles received within the set of openings, wherein a first receptacle in the set of receptacles has a seat, located between the upper surface and lower surface, and the first post is received within the seat, and a locking tab moveable between a locked position, where the locking tab blocks the removal of the first post from the seat, and an unlocked position, where the locking tab does not block the removal of the first post from the seat.

In another aspect, the disclosure relates to a connector assembly for connecting a ceiling fan blade to a set of mount posts, with the blade having a set of openings, the connector comprising: a set of receptacles connected by a frame and the set of receptacles received within the set of openings, wherein a first receptacle in the set of receptacles has a seat, located between the upper surface and lower surface, and a first post from the set of posts is received within the seat, and a locking tab moveable between a locked position, where the locking tab blocks the removal of the first post from the seat, and an unlocked position, where the locking tab does not block the removal of the first post from the seat.

DETAILED DESCRIPTION

Figure 1:
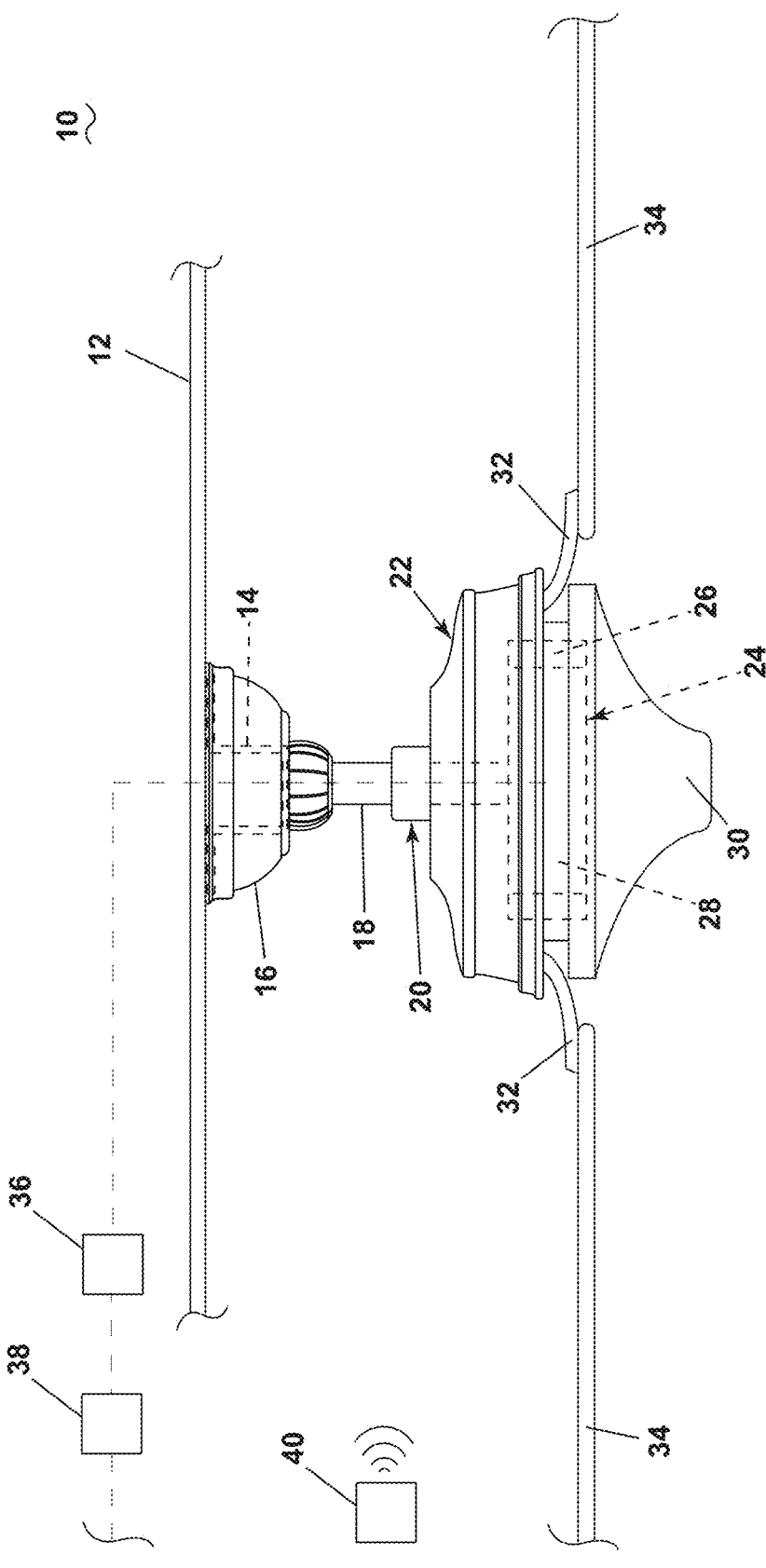
FIG. 1 is a schematic view of a structure with a ceiling fan suspended from a structure.

The disclosure is related to a ceiling fan and ceiling fan blade, which can be used, for example, in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a ceiling fan 10 is suspended from a structure 12. In non-limiting examples, the ceiling fan 10 can include one or more ceiling fan components including a hanger bracket 14, canopy 16, a downrod 18, a motor adapter 20, a motor housing 22 at least partially encasing a motor 24 having a rotor 26 and a stator 28, a light kit 30, and a set of blade irons 32. In additional non-limiting examples, the ceiling fan 10 can include one or more of a controller, a wireless receiver, a ball mount, a hanger ball, a light glass, a light cage, a spindle, a finial, a switch housing, blade forks, blade tips or blade caps, or other ceiling fan components. A set of blades 34 can extend radially from the ceiling fan 10, and can be rotatable to drive a volume of fluid such as air. The blades 34 can be any suitable fan blade, extending between a root and a tip in a span-wise direction and a leading edge and a trailing edge in a chord-wise direction. The blades 34 can be operably coupled to the motor 24 at the rotor 26, such as via the blade irons 32. The blades 34 can include a set of blades 34, having any number of blades, including only one blade.

The structure 12 can be a ceiling, for example, from which the ceiling fan 10 is suspended. It should be understood that the structure 12 is schematically shown and is by way of example only, and can include any suitable building, structure, home, business, or other environment wherein moving air with a ceiling fan is suitable or desirable. The structure 12 can also include an electrical supply 36 can be provided in the structure 12, and can electrically couple to the ceiling fan 10 to provide electrical power to the ceiling fan 10 and the motor 24 therein. It is also contemplated that the electrical supply be sourced from somewhere other than the structure 12, such as a battery or generator in non-limiting examples.

A controller 38 can be electrically coupled to the electrical supply 36 to control operation of the ceiling fan 10 via the electrical supply 36. Alternatively, the controller 38 can be wirelessly or communicatively coupled to the ceiling fan 10, configured to control operation of the ceiling fan 10 remotely, without a dedicated connection. Non-limiting examples of controls for the ceiling fan 10 can include fan speed, fan direction, or light operation. Furthermore, a separate wireless controller 40, alone or in addition to the wired controller 38, can be communicatively coupled to a controller or a wireless receiver in the ceiling fan 10 to control operation of the ceiling fan 10. It is further contemplated in one alternative example that the ceiling fan be operated by the wireless controller 40 alone, and is not operably coupled with the wired controller 38.

Figure 2:
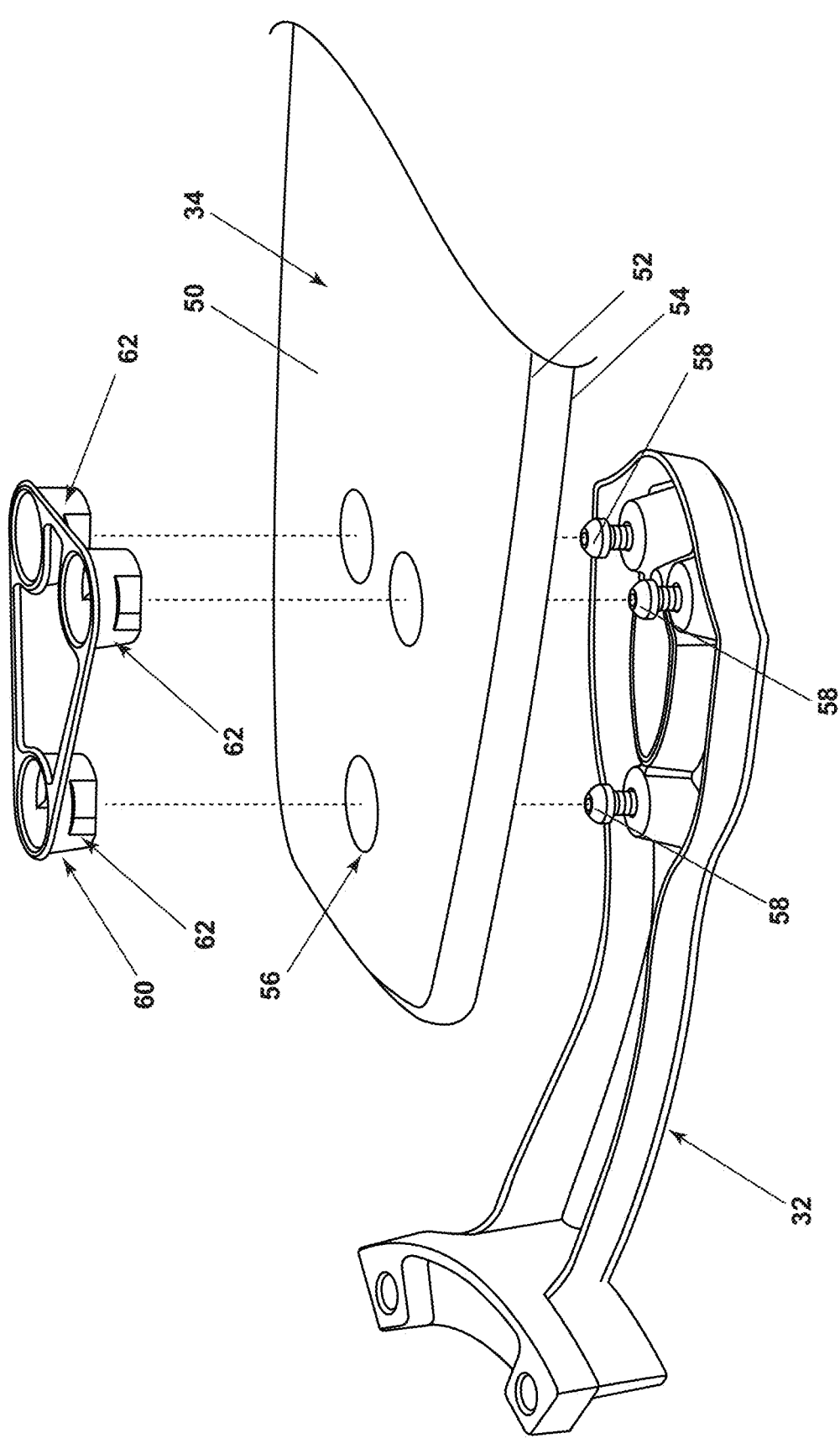
FIG. 2 is an exploded view showing a blade, a blade iron, and a connector for use with the ceiling fan of FIG. 1.

Referring to FIG. 2, the blade 34 includes a body 50 with an upper surface 52 and a lower surface 54, including a set of openings 56 extending through the body 50 between the upper surface 52 and the lower surface 54. A set of mount posts 58 mount to and extend from the blade iron 32. The mount posts 58 can be fasteners, for example, such as screws with a head, as well as non-fasteners, such as pins. A connector 60 includes a set of receptacles 62. The set of receptacles 62 for the connector 60 can be complementary to the set of openings 56 in the blade and the set of mount posts 58, such that connecting the mount posts 58 to the connector 60 through the openings 56 mounts the blade 34 to the blade iron 32.

Figures 3, 4:
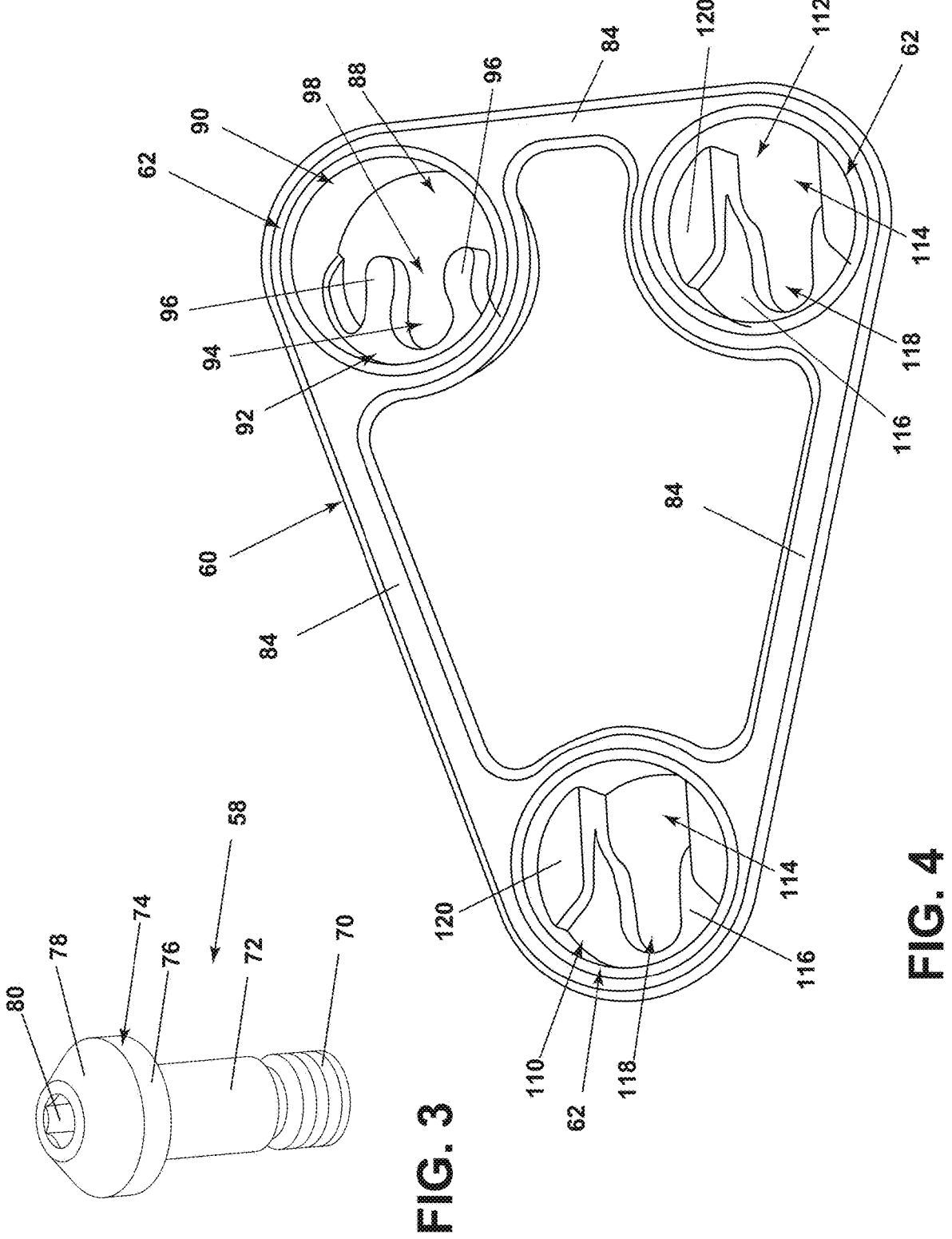
FIG. 3 shows an enlarged view of a fastener for connecting the connector of FIG. 2 to the blade iron of FIG. 1.
FIG. 4 shows an enlarged perspective view of the connector of FIG. 2.

Referring to FIG. 3, each mount post 58 can include a threaded end 70 to mount the mount post 58 to the blade iron 32 of FIG. 2. A shoulder 72 spaces a head 74 from the threaded end 70. The head 74 can include a side wall 76, a lead-in taper 78, and a receiver 80 to receive a tool for fastening the mount post 58 to the blade iron 32. It should be appreciated that alternative suitable fasteners for use as the mount post 58 is contemplated.

Referring to FIG. 4, a set of arms 84 connect the receptacles 62 to form the connector 60. While the connector 60 is formed with three receptacles 62 and three arms 84, any number of receptacles or arms is contemplated. A first receptacle 90 of the set of receptacles 62 includes an opening 88 at least partially defined by a snap-lock feature 92, which forms a seat 94. The opening 88 is sized to provide room for the head 74 of the mount post 58. A pair of resilient spaced fingers 96 form the snap-lock 92, at least partially define the seat 94, and curve to define a neck 98 that is narrower than the seat 94. The pair of fingers 96 can be arranged such that the neck 98 is narrower than the diameter of the shoulder 72 of the mount post 58. Such sizing permits insertion of the mount post 58 into the seat 94 by flexing the fingers 96 to widen the neck 98, providing room for insertion of the shoulder 72 into the seat 94. The fingers 96 can be made of bendable or flexible plastics, metals, polymers, or composites, in non-limiting examples, permitting resilient flexion of the fingers 96 to narrow or widen the neck 98. Once the shoulder 72 is positioned in the seat 94, the fingers 96 can flex to return to their original position, returning the neck 98 to its original width, and securing the mount post 58 within the seat 94 at the shoulder 72. Additionally, the head 74 can position over the fingers 96 to secure the connector 60 to the blade 34.

A second receptacle 110 can be similar to a third receptacle 112. The second and third receptacles 110, 112 can include an opening 114 sized to receive the head 74 of the mount post 58. A base 116 can form a seat 118 sized to receive the neck 98 of the mount posts 58, and position beneath the head 74 to secure the connector 60 to the blade 34. The second and third receptacles 110, 112 can include raised portions 120, which can at least partially define the opening 114. The raised portions 120 are positioned higher than the base 116, and can guide the head 74 to properly position at the base 116.

Figure 5:
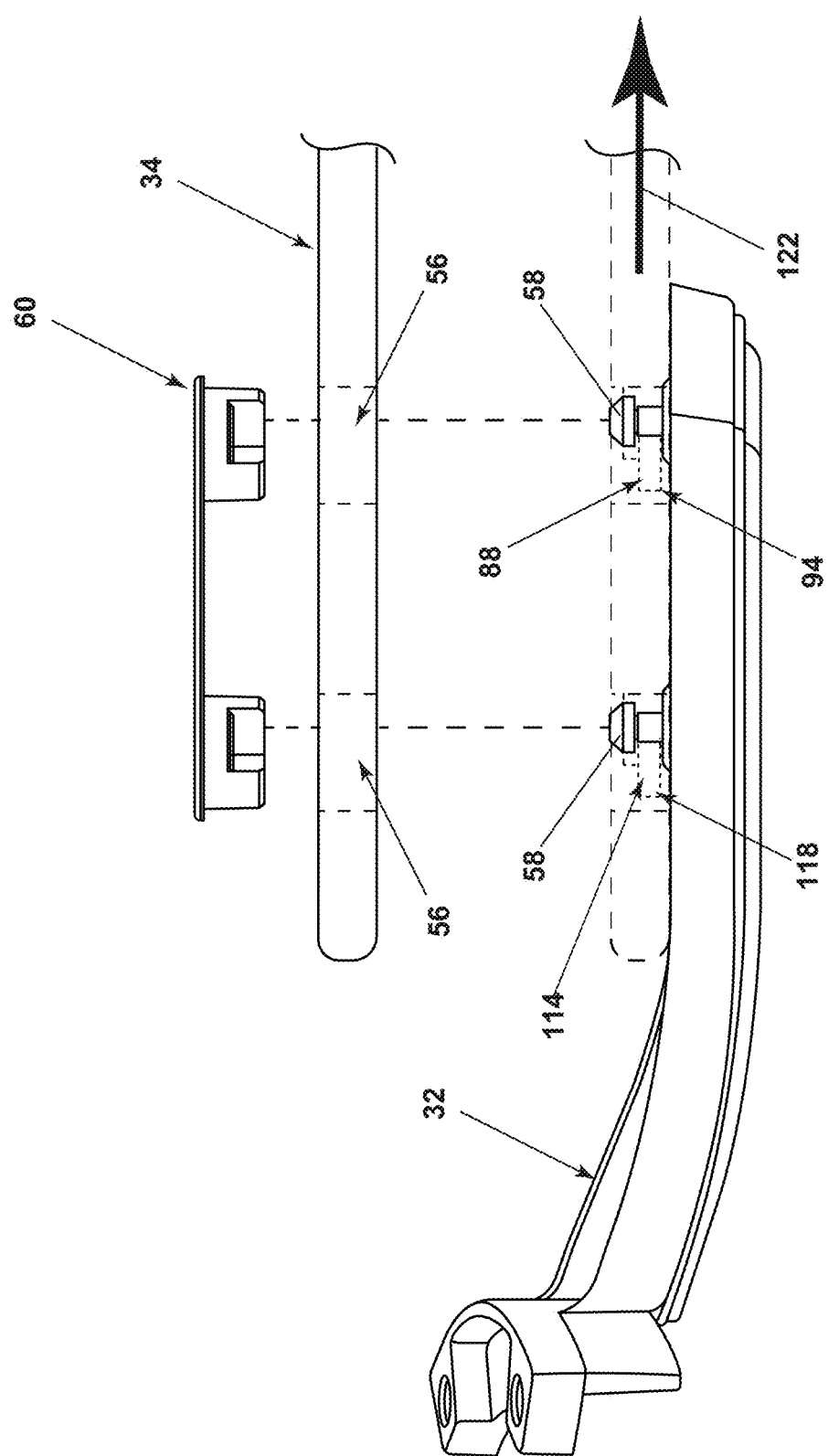
FIG. 5 shows an exploded side view of the blade, blade iron, and connector, showing attachment of the blade iron via the fasteners of FIG. 3 and the connector of FIG. 4.

Referring to FIG. 5, the connector 60 can position within the openings 56 in the blade 34. The blade 34 can be positioned adjacent to the blade iron 32, shown in phantom, such that the mount posts 58 position within the openings 88, 114 of the set of receptacles 62. After insertion, the blade 34 can be pulled away from the blade iron 32 in the direction shown by arrow 122 to secure the blade 34 to the blade iron 32 via the connector 60 at the mount posts 58. Pulling the blade 34 in the direction along the arrow 122 positions the mount posts 58 within the seats 94, 118, securing the mount posts 58 to the connector 60, and therefore, the blade 34 to the blade iron 32. It should be understood, that the blade iron 32 could be pulled in a direction opposite of the arrow 122, to achieve the same effect as pulling the blade 34 in the direction of the arrow 122.

Figure 6:
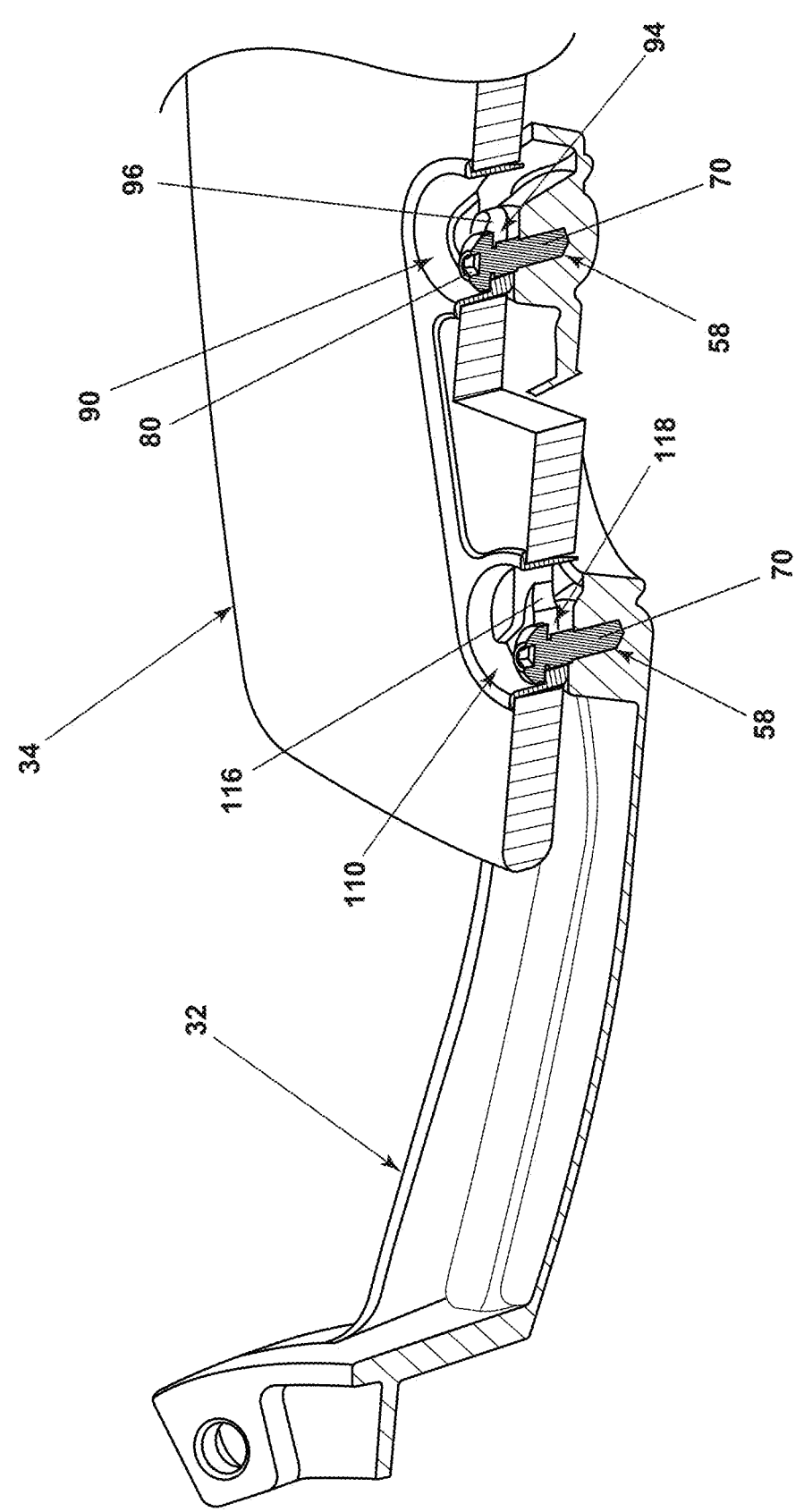
FIG. 6 shows a section view of the blade of FIG. 2 mounted to the blade iron of FIG. 2 with the connector of FIG. 4.

FIG. 6 shows a section view of the blade 34 connected to the blade iron 32 after the blade 34 is pulled along arrow 122, relative to the blade iron 32, as shown in FIG. 5. The section as shown illustrates sections of the two different types of receptacles 90, 110, while the section omits the third receptacle 112 which is the same as the second receptacle 110. The receptacle 90 secures the mount post 58 within the seat 94 at the fingers 96. Additionally, the mount post 58 can be tightened with a tool at the receiver 80 to tighten the threaded end 70 to further secure the blade 34 to the blade iron 32. Alternatively, it is contemplated that the mount post 58 is preinstalled, or sized, such that the sliding movement along arrow 112 of FIG. 5, results in a compression fit at the connector 60, avoiding the need to tighten the mount posts 58. For example, the receptacles 62 could include a ramped surface to permit the compression fit resultant of the sliding movement.

At the second receptacle 110, the mount post 58 secures within the seat 118 against the base 116, securing the blade 34 to the blade iron 32. The mount post 58 can be tightened at the threaded end 70 to further secure the blade 34 to the blade iron 32 within the seat 118.

The receptacle 90 with the fingers 96 secures the blade 34 to the blade iron 32 by securing the mount post 58 within the seat 94 by way of the spring force of the fingers 96. The fingers 96 further provide a surface against which the head 74 can abut to secure vertical separation between the blade 34 and the blade iron 32. Additionally, the second and third receptacles 110, 112 utilize the base 116 providing the seat 118 to further secure the vertical separation between the blade 34 and the blade iron 32.

After assembly and during ceiling fan operation, the inertia from the rotation of the blade 34 is in a direction similar to the direction of the arrow 122 of FIG. 5. In this way, the rotating operation of the ceiling fan secures the blade 34 to the blade iron 32 by way of the inertial force of rotation of the blade 34 and the shape of the receptacles 62.

Figure 7:
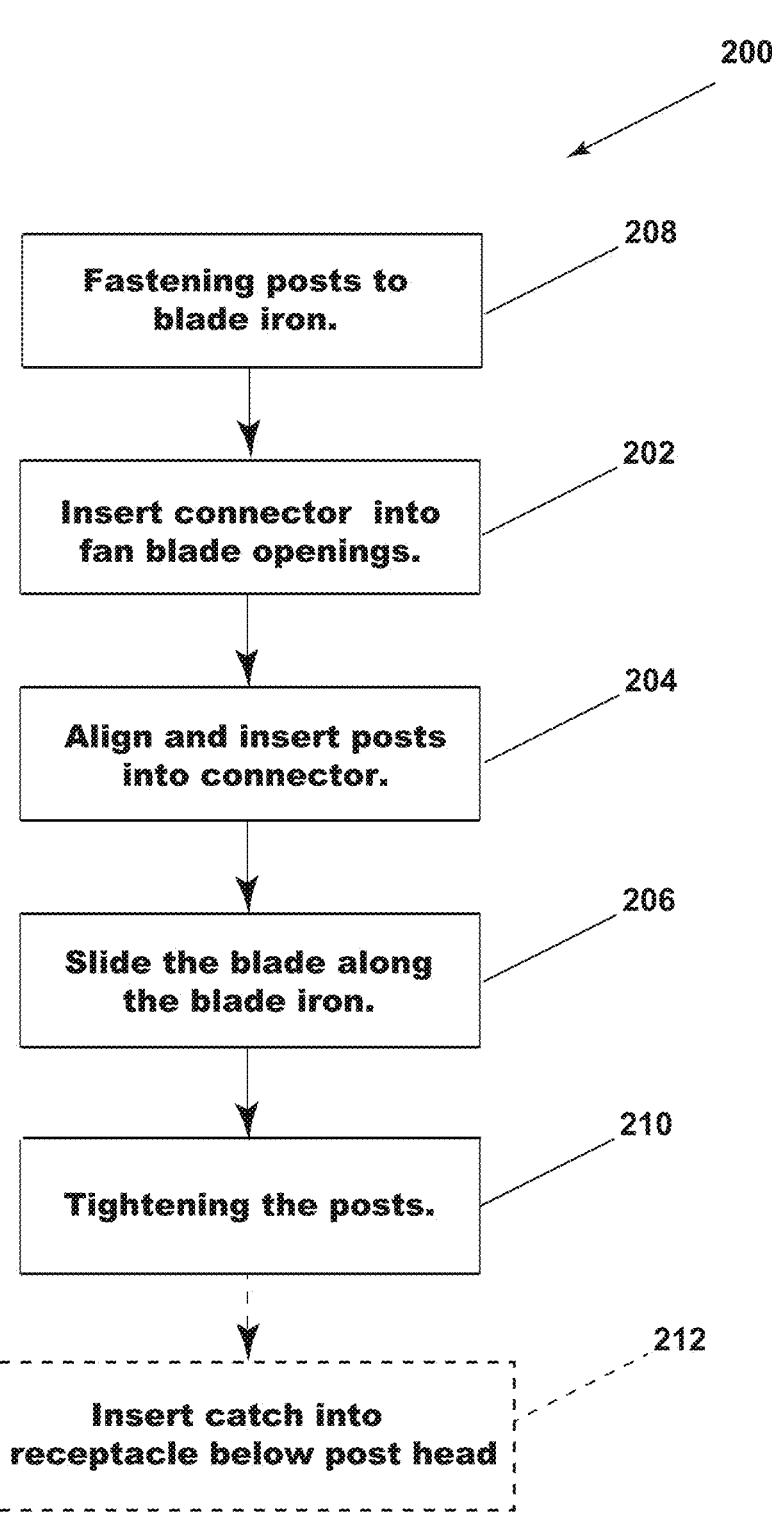
FIG. 7 shows a method of connecting a blade to a blade iron using a connector.

FIG. 7 shows a flow chart illustrating a method 200 of connecting a blade 34 to a blade iron 32 for a ceiling fan 10. At 202, the method 200 can include inserting a connector 60 into openings 56 in the body 50 of a fan blade 34. In one example, the connector 60 includes receptacles 62 sized to be received within the openings 56, and numbered complementary with one another. At 204, the method can include aligning posts 58 with the openings 56, and inserting the mount posts 58 through the openings 56 into receptacles 62 on the connector 60, and into the position shown in phantom in FIG. 5

At 206, the method can include sliding the blade 34 along the blade iron 32 in a first direction, such as in the direction of the arrow 122 of FIG. 5, such that the blade 34 can be pulled toward a blade tip, away from the blade iron 32. Sliding the blade 34 positions the mount posts 58 within seats 94, 118 in the receptacles 62, securing the blade 34 to the blade iron 32 with the snap-lock 92 securing at least one mount post 58 with fingers 96.

Optionally, at 208, the method 200 can include fastening the mount posts 58 to the blade iron 32, while it is contemplated that such fastening can be completed by a manufacturer or assembly prior to installation. Additionally, at 210, the method 200 can optionally include securing the mount posts 58 within the seats 94, 118 by tightening the mount posts 58 against the receptacles 62.

In order to remove the blade 34 from the blade iron 32, the user can slide the blade 34 in a direction opposite of that of arrow 122, separating the mount posts 58 from the seats 94, 118, and permitting removal of the blade 34 from the blade iron 32 by lifting the blade 34 away from the blade iron 32. The posts 58 need not be loosened to remove the blade 34 from the blade iron 32, unless the mounting posts have optionally been tightened against the receptacles 62.

Figure 8:
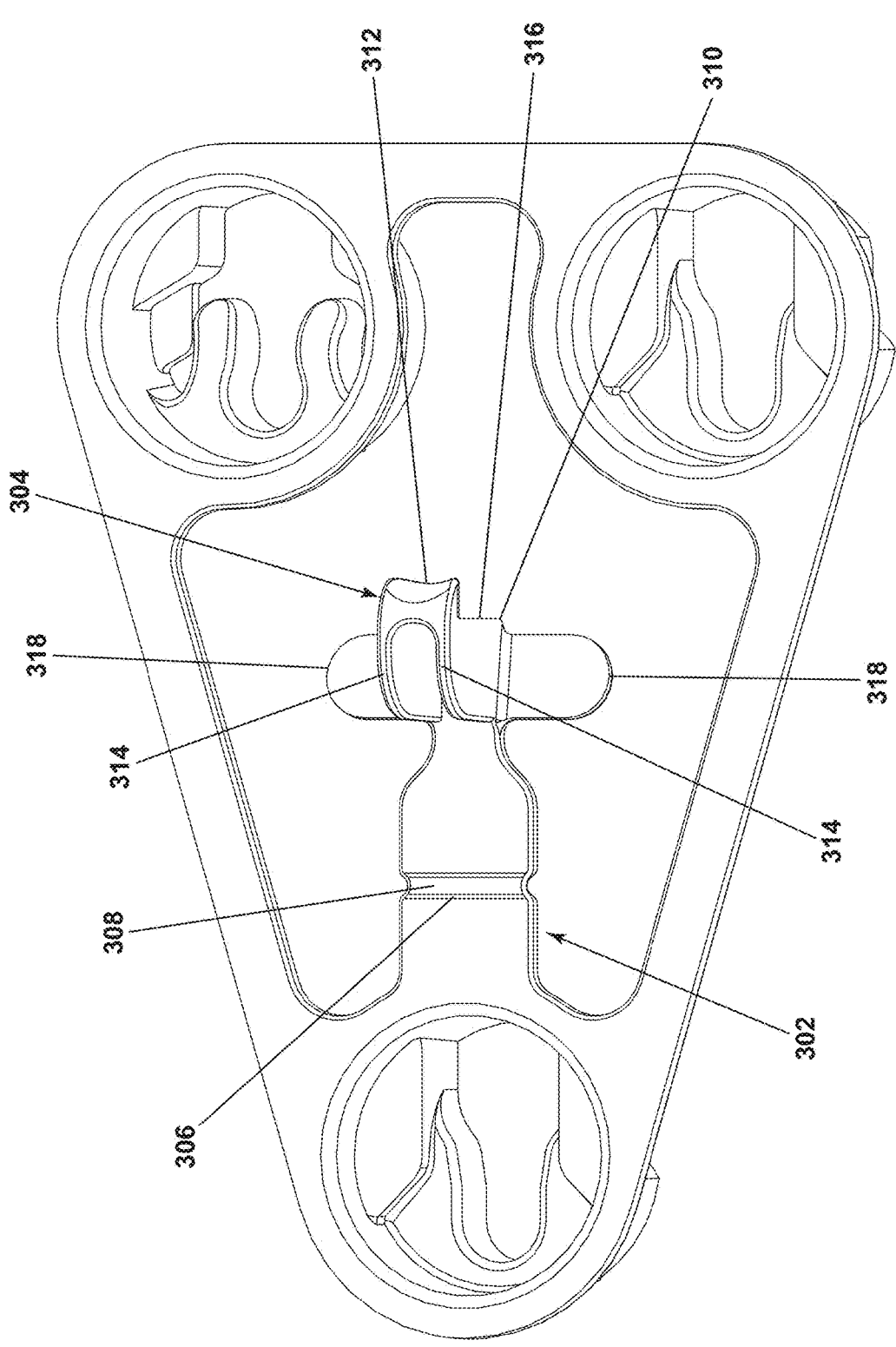
FIG. 8 illustrates the connector of FIG. 4 with the addition of a locking tab.

FIG. 8 illustrates yet another connector 160, which is identical to the connector 60, except for the addition of a locking tab 300, which prevents the relative movement of the connector 160 and the fan blade 34 to the blade iron 32 and/or mount post 58. Since the connector 160 is identical to the connector 60, except for the locking tab 300, like numerals will be used to identify like parts, and only the locking tab 300 and its function will be described in detail, with the understanding that the prior description for the connector 60 applies to the connector 160.

The locking tab 300 includes stem 302 terminating in a tab 304. The stem 302 includes first and second hinges, 306, 308, which are illustrated as living hinges, but could be other similarly functioning structures. The tab 304 includes a main body 310 that terminates in a catch 312. The main body 310 is illustrated as two spaced walls 314, which are spanned by a connecting wall 316, which transitions to the catch 312. Wings 318 extend from the corresponding sidewalls 314.

Figure 9:
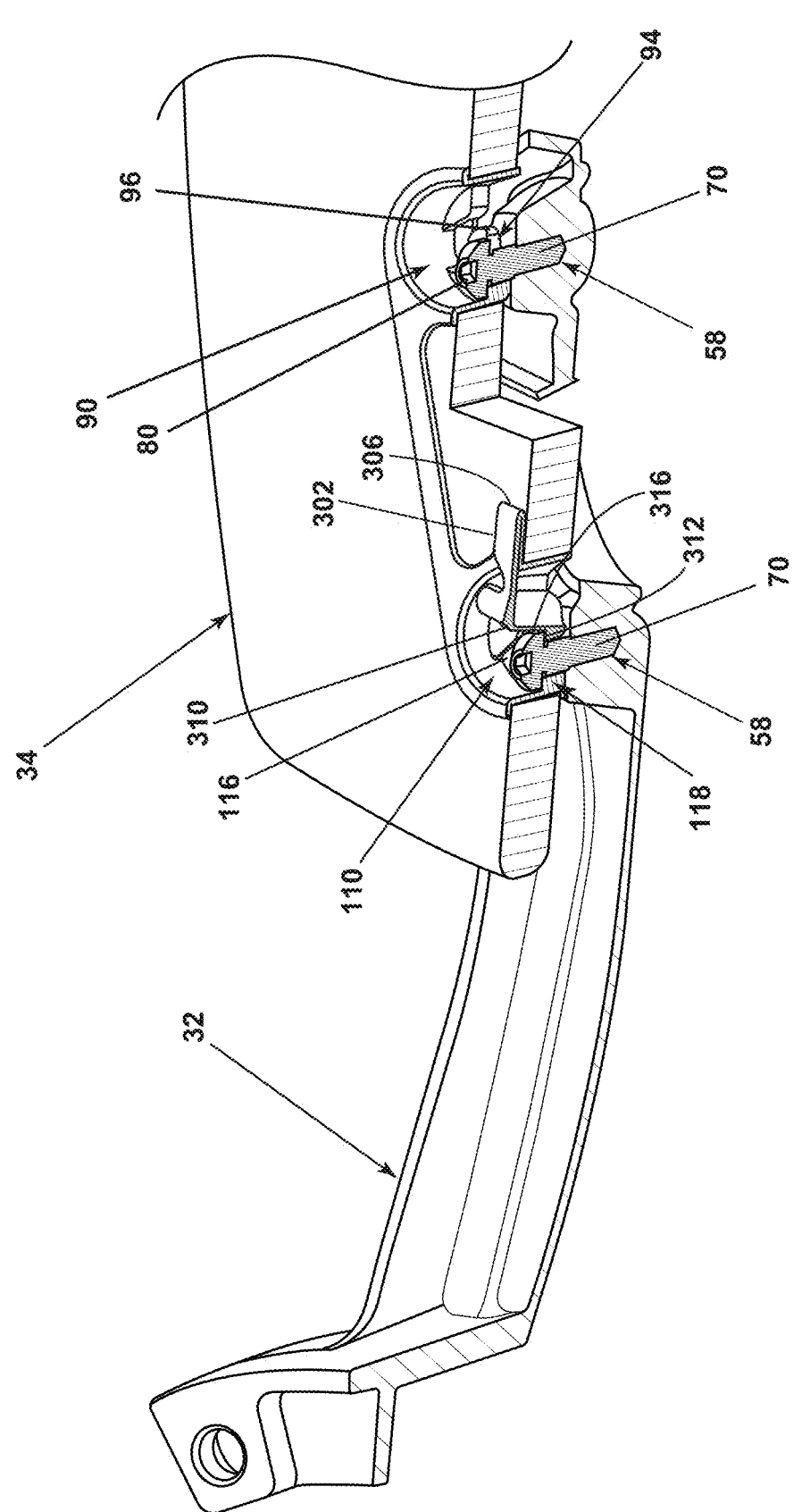
FIG. 9 illustrates the connector of FIG. 8 with the locking tab shown in a locked orientation.

In operation, as previously described, the blade 34 and blade iron 32 are relatively moved such that the mount posts 58 are positioned relative to the connector 60 as shown in FIG. 4, and the blade 34 is then slid relative to the blade iron 32 to seat the mounting posts 58 into the seats 94, 118, where the snap-lock 92 secures at least one mount post 58 with fingers 96. As is shown in step 212 of FIG. 7, after the seating of the mount posts 58 into the seats 94, 118, the tab 304 is rotated about one or both of the hinges 306, 308 to locate the main body 310 within the opening 114 such that the catch 312 is at substantially the same level as the base 116. The catch 312 is deflectable and can be deflected until it is received below the head 74 of the mount post 58. As is seen in FIG. 9, the catch 312 is thus positioned to fill the space in the receptacle 62 and prevent the return sliding of the blade 34 relative to the blade iron 32 until the catch 312 is removed from the receptable 62 by a user pulling up on the wings 318. In this way, the catch 312 functions to lock the blade 34 to the blade iron 32.

The connector and related connector assembly as described herein provides for simplified installation of a fan blade to a blade iron for a ceiling fan, facilitating user installation. The connector further provides a secure connection between the blade and the blade iron, and utilizes the inertial momentum of the rotating fan blade to maintain positioning of the mount posts within the connector during fan operation.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan comprising:
   a motor;
   a blade having an upper surface and an opposing lower surface, with a set of openings passing through at least one of the upper surface or lower surface, and the blade extending between a root and a tip;
   a blade iron including a set of mount posts arranged complementary to the set of openings and a first post from the set of mount posts terminates, within a corresponding opening, between the upper surface and lower surface;
   a connector comprising:
   a set of receptacles received within the set of openings, wherein a first receptacle in the set of receptacles has a seat, located between the upper surface and lower surface, and the first post is received within the seat,
   a frame connecting the set of receptacles, and
   a locking tab moveable between a locked position, where the locking tab blocks the removal of the first post from the seat, and an unlocked position, where the locking tab does not block the removal of the first post from the seat.

2. The ceiling fan of claim 1 wherein the connector comprises a hinge about which the locking tab pivots between the locked position and the unlocked position.

3. The ceiling fan of claim 2 wherein the locking tab comprises a catch that is located between the first post and the first receptacle in the locked position.

4. The ceiling fan of claim 3 wherein the first post terminates in a first head and the catch is deflectable, whereby as the locking tab is moved to the locked position, the catch deflects to pass below the first head and fill the space between the first post and the receptacle.

5. The ceiling fan of claim 4 wherein the catch comprises spaced walls defining a gap that receives the first post in the locked position.

6. The ceiling fan of claim 5 wherein the locking tab further comprises at least one wing coupled to the catch.

7. The ceiling fan of claim 2 wherein the connector comprises a connector opening in which the living hinge is located.

8. The ceiling fan of claim 7 wherein the locking tab is located within the connector opening in the unlocked position and located within the first receptacle in the locked position.

9. The ceiling fan of claim 8 wherein the frame at least partially defines the connector opening.

10. The ceiling fan of claim 1 wherein the frame comprises arms extending between the receptacles.

11. The ceiling fan of claim 2 wherein the hinge is a living hinge.

12. A connector assembly for connecting a ceiling fan blade to a set of mount posts, with the ceiling fan blade having a set of openings, the connector comprising:

a set of receptacles connected by a frame having a set of arms extending between the receptacles and the set of receptacles received within the set of openings, wherein a first receptacle in the set of receptacles has a seat, located between the upper surface and lower surface, and a first post from the set of posts is received within the seat, and a locking tab moveable between a locked position, where the locking tab blocks the removal of the first post from the seat, and an unlocked position, where the locking tab does not block the removal of the first post from the seat.

13. The connector assembly of claim 12 wherein the locking tab comprises a catch that is located between the first post and the receptacle in the locked position.

14. The connector assembly of claim 13 wherein the first post terminates in a first head and the catch is deflectable, whereby as the locking tab is moved to the locked position, the catch deflects to pass below the first head and fill the space between the first post and the receptacle.

15. The connector assembly of claim 14 wherein the catch comprises spaced walls defining a gap that receives the first post in the locked position.

16. The connector assembly of claim 15 wherein the locking tab further comprises at least one wing coupled to the catch.

17. The connector assembly of claim 12 wherein the receptacles and frame form a connector opening in which the locking tab is in the unlocked position.

18. The connector assembly of claim 17 wherein the locking tab is located within the first receptacle in the locked position.

19. The connector assembly of claim 12 further comprising a blade iron from which the set of posts extend.

20. The connector assembly of claim 19 wherein the blade iron has a first end configured to mount to a rotor of a motor for the ceiling fan and a second end from which the set of posts extend.

21. The connector assembly of claim 12 wherein the connector assembly comprises a hinge about which the locking tab pivots between the locked position and the unlocked position.

22. A ceiling fan comprising:

a motor;

a blade having an upper surface and an opposing lower surface, with a set of openings passing through at least one of the upper surface or lower surface, and the blade extending between a root and a tip;

a blade iron including a set of mount posts arranged complementary to the set of openings and a first post from the set of mount posts terminates, within a corresponding opening, between the upper surface and lower surface;

a connector comprising:

a set of receptacles received within the set of openings, wherein a first receptacle in the set of receptacles has a seat, located between the upper surface and lower surface, and the first post is received within the seat, and a locking tab moveable between a locked position, where the locking tab blocks the removal of the first post from the seat, and an unlocked position, where the locking tab does not block the removal of the first post from the seat, wherein the locking tab comprises a catch that is located between the first post and the receptacle in the locked position, and the catch comprises spaced walls defining a gap that receives the first post in the locked position.

* * * * *